United States Patent
Rawlins et al.

(10) Patent No.: US 8,005,560 B2
(45) Date of Patent: Aug. 23, 2011

(54) METHOD OF OPTIMIZING QUEUE TIMES IN A PRODUCTION CYCLE

(75) Inventors: Brad J. Rawlins, Essex Junction, VT (US); James Rice, Danbury, CT (US); Yunsheng Song, Hopewell Junction, NY (US); Yutong Wu, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 177 days.

(21) Appl. No.: 11/874,518

(22) Filed: Oct. 18, 2007

(65) Prior Publication Data
US 2009/0105854 A1 Apr. 23, 2009

(51) Int. Cl.
*G06F 19/00* (2011.01)
*G06F 11/30* (2006.01)

(52) U.S. Cl. .......... 700/100; 700/99; 700/102; 700/109; 700/121; 702/183

(58) Field of Classification Search ............ 700/100, 700/99, 102, 109, 101
See application file for complete search history.

(56) References Cited

U.S. PATENT DOCUMENTS

| | | | |
|---|---|---|---|
| 6,647,307 B1 * | 11/2003 | Huang et al. ............ | 700/102 |
| 6,959,225 B1 * | 10/2005 | Logsdon et al. .......... | 700/100 |
| 7,085,612 B2 * | 8/2006 | Liu et al. ................. | 700/91 |
| 2005/0182596 A1 * | 8/2005 | Chang ..................... | 702/182 |

* cited by examiner

*Primary Examiner* — Albert Decady
*Assistant Examiner* — Sivalingam Sivanesan
(74) *Attorney, Agent, or Firm* — Cantor Colburn LLP; Yuanmin Cai

(57) ABSTRACT

A method of optimizing production cycle queue time includes selecting a plurality of process steps for a production cycle, calculating queue times for each of the plurality of process steps, statistically analyzing the queue times, and generating at least one visual output that illustrates the statistically analyzed queue times.

19 Claims, 5 Drawing Sheets

METHOD OF OPTIMIZING QUEUE TIMES IN A PRODUCTION CYCLE

BACKGROUND OF THE INVENTION

1. Field of the Invention

The present invention relates to the art of production optimization and, more particularly, to a method of optimizing queue times in a production cycle.

2. Description of the Background

Semiconductor wafer fabrication includes a series of carefully designed process steps running on sophisticated capital equipment. The process steps are run in a strictly defined sequence. In many cases, product quality is affected by a total queue time spent on specific process steps, wherein the total queue time includes waiting time, i.e., the time between process steps, dwell time, i.e., the time waiting for a process step to commence and process time i.e., the time spent in the process step. Process steps may include masking, photolithography, etching, rinsing, etc. Thus, for a given process step, two questions are often asked: does queue time have a significant effect on product quality? If yes, what is the time window during which products can be safely processed at this process step?

Conventionally, process steps have been evaluated manually. More specifically, process steps known or suspected to have an input on dependent variables, e.g., yield, quality etc., were chosen, and queue times for the chosen process steps calculated. At that point, a scatter plot was generated to determine whether queue time is correlated to the dependent variable. Unfortunately, various drawbacks exist with the manual process. As process steps are chosen based on experience or theories which may vary with each user, inexperienced users often times do not know which process steps to analyze. Experienced users often times miss new signals associated with new process steps. In addition, as the analysis is performed manually, a considerable amount of time is required to properly analyze a given process step, let alone the numerous process steps associated with a semiconductor wafer fabrication process. Finally, without reliable statistical analysis, any results obtained are highly subjective.

In addition to manual analysis, computer implemented methods are also employed. The computer implemented methods require retrieving manufacturing information associated with a fabrication process, where manufacturing information includes multiple process step pairs. The process step pairs are divided into a high group and a low group through a statistical clustering method. Values, such as p-values, are then calculated for each process step pair. The process step pairs are then ranked and analyzed to identify a particular process step pair. While effective to a degree, the above described method fails to account for individual process steps and different queue time combinations across different combinations of process steps that may have an effect on output. The above described method also fails to evaluate the effect of queue time to yield or performance quantitatively, such as whether a one hour reduction in queue time could increase yield.

BRIEF DESCRIPTION OF THE INVENTION

In accordance with one aspect of the present invention, a method of optimizing production cycle queue time is provided. The method includes selecting a plurality of process steps for a production cycle, calculating queue times for each of the plurality of process steps, statistically analyzing the queue times, and generating at least one visual output that illustrates the statistically analyzed queue times.

In accordance with another aspect of the present invention, a computer program product is provided. The computer program product includes a computer useable medium including a computer readable program. The computer readable program, when executed on a computer, causes the computer to calculate queue times for at least one user input process cycle operation, statistically analyze the queue times, and generate at least one visual output that illustrates the statistically analyzed queue times.

Based on the above, it should be appreciated that the present invention provides a system for analyzing queue times in a production cycle that avoids many of the drawbacks associated existing analysis methods. More specifically, by statistically analyzing queue times for at least one process cycle and viewing an illustration that graphically illustrates the statistical analysis, any problems associated with user inexperience, subjectivity and time are removed. That is, the present invention provides an objective view of the at least one process step. In this manner, personnel can readily and with confidence, identify queue times that may effect dependent variables in the production process such as yield and quality. In any event, additional features and advantages are realized through the techniques of the present invention. Other embodiments and aspects of the invention are described in detail herein and are considered a part of the claimed invention. For a better understanding of the invention with advantages and features, refer to the description and to the drawings wherein like reference numeral refer to corresponding parts in the several views.

DETAILED DESCRIPTION

Figure 1:
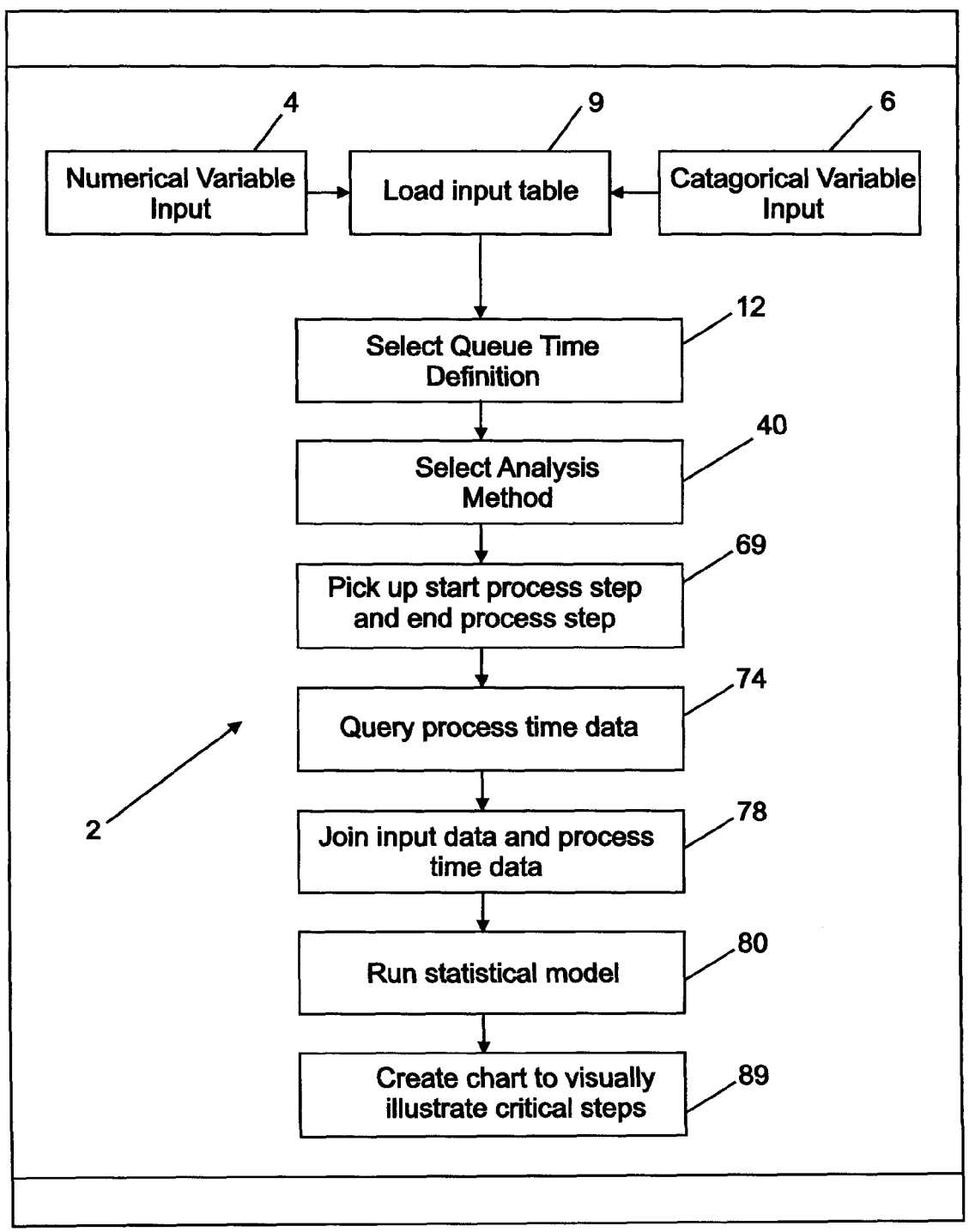
FIG. 1 is a flow chart illustrating a method of optimizing queue times in a production cycle according to an embodiment of the present invention.

With initial reference to FIG. 1, a method for optimizing queue times in a production cycle is generally indicated at 2. To initiate the optimization method, a user selects an input variable type. If the input/dependent variable is numeric, for example, overall process yield, the value or range of values is input in block 4 and a general linear model (GLM) is employed as will be discussed below. If the input variable/dependent variable is categorical, such as good/bad, fast/slow, the category is input in block 6 and an analysis of variance model (ANOVA) is employed as will be detailed below. In any event, once the dependent variable type has been selected, dependent variable data is loaded into an input table in block 9. At this point, the user is prompted to select a queue time definition from one of six queue time options.

Figure 2:
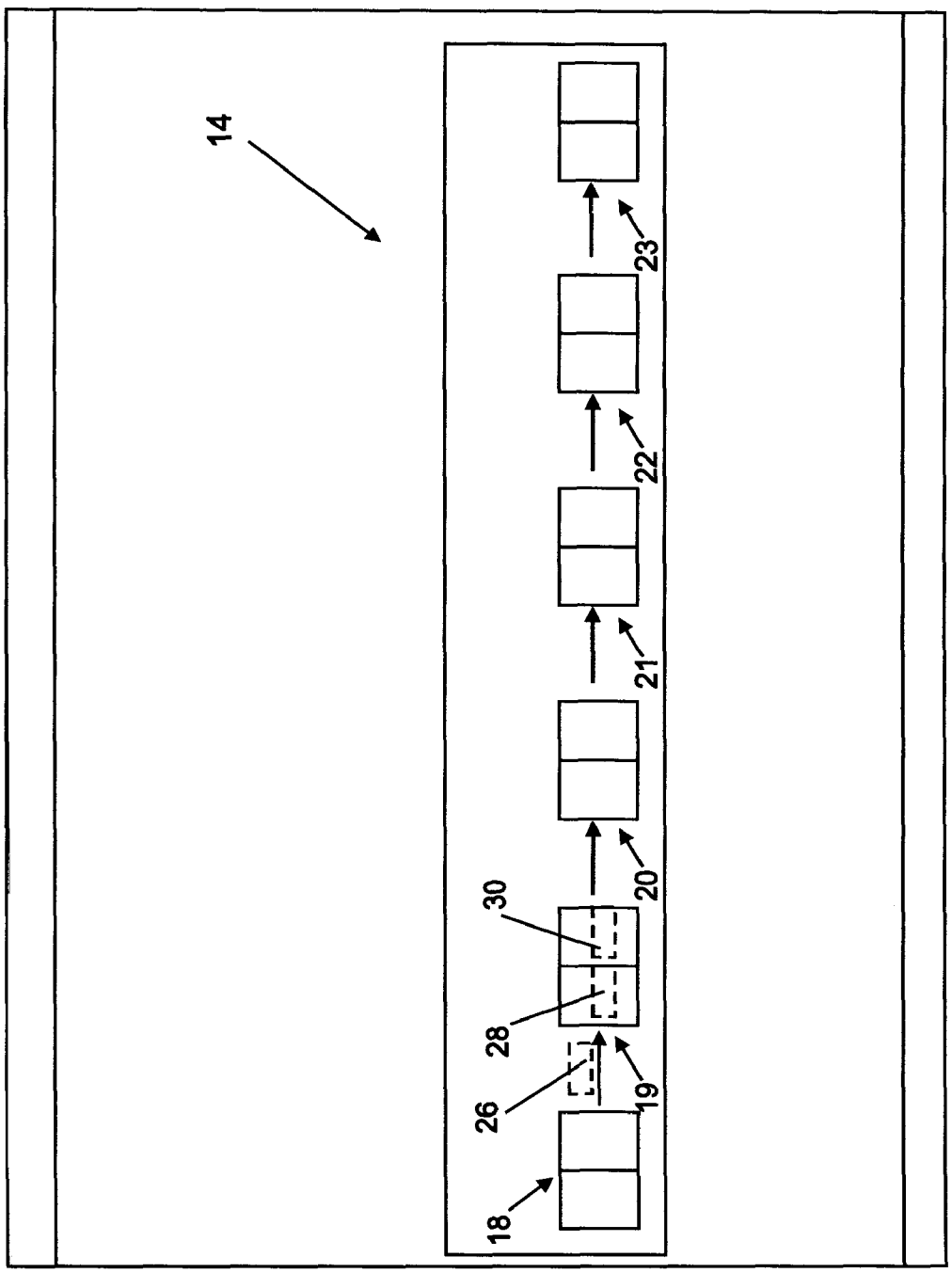
FIG. 2 is a schematic view of a plurality of process steps of an overall production cycle to be analyzed by the exemplary method of FIG. 1.

As best as shown in FIG. 2, a production process cycle for fabricating semiconductors is indicated generally at 14. Process cycle 14 includes a number of operations or process blocks 18-23. Process blocks 18-23 can be, for example, masking, photolithography, etching, rinsing or any other of a number of steps required for producing a semiconductor chip/wafer. Of course it should be recognized that the number of process blocks 18-23 is for illustrative purposes only and that production cycle 14 may include numerous additional production steps not shown. In addition, it should be recognized that each process block 18-23 can include a single process or involve multiple processes. In any event, each process block 18-23 includes corresponding queue times as will be defined more clearly below. For example, a lot 26 represents a first queue time illustrated as a staging or wait time prior to entering process block 19. Lot 28 illustrates a second queue or dwell time waiting for process 19 to begin and a lot 30 illustrates a third process or queue time defined as the overall process time required by process block 19. Thus, each process block 18-23 includes at least three queue times, i.e. wait time, dwell time and process time. In addition, the user can select combinations of the aforementioned queue times to establish three additional queue time parameters. That is, the user can select a combination of wait time/dwell time, the dwell time/process time, and/or wait/dwell/and process time. In any event, once the particular queue time definition has been entered in block 12 of FIG. 1, the user inputs a particular analysis option in block 40.

Figure 3:
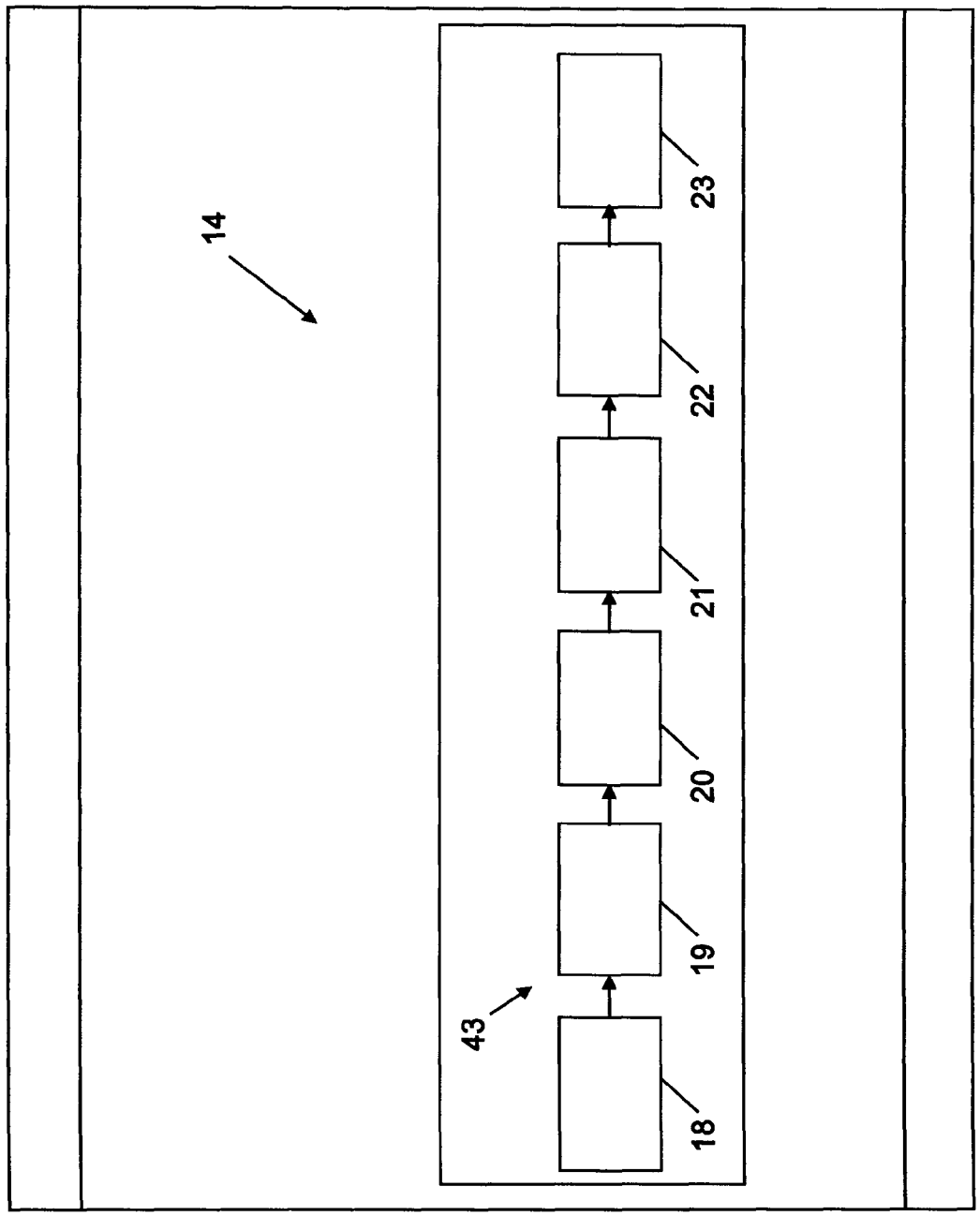
FIG. 3 is a first analysis strategy employed by the exemplary method of FIG. 1.
Figure 4:
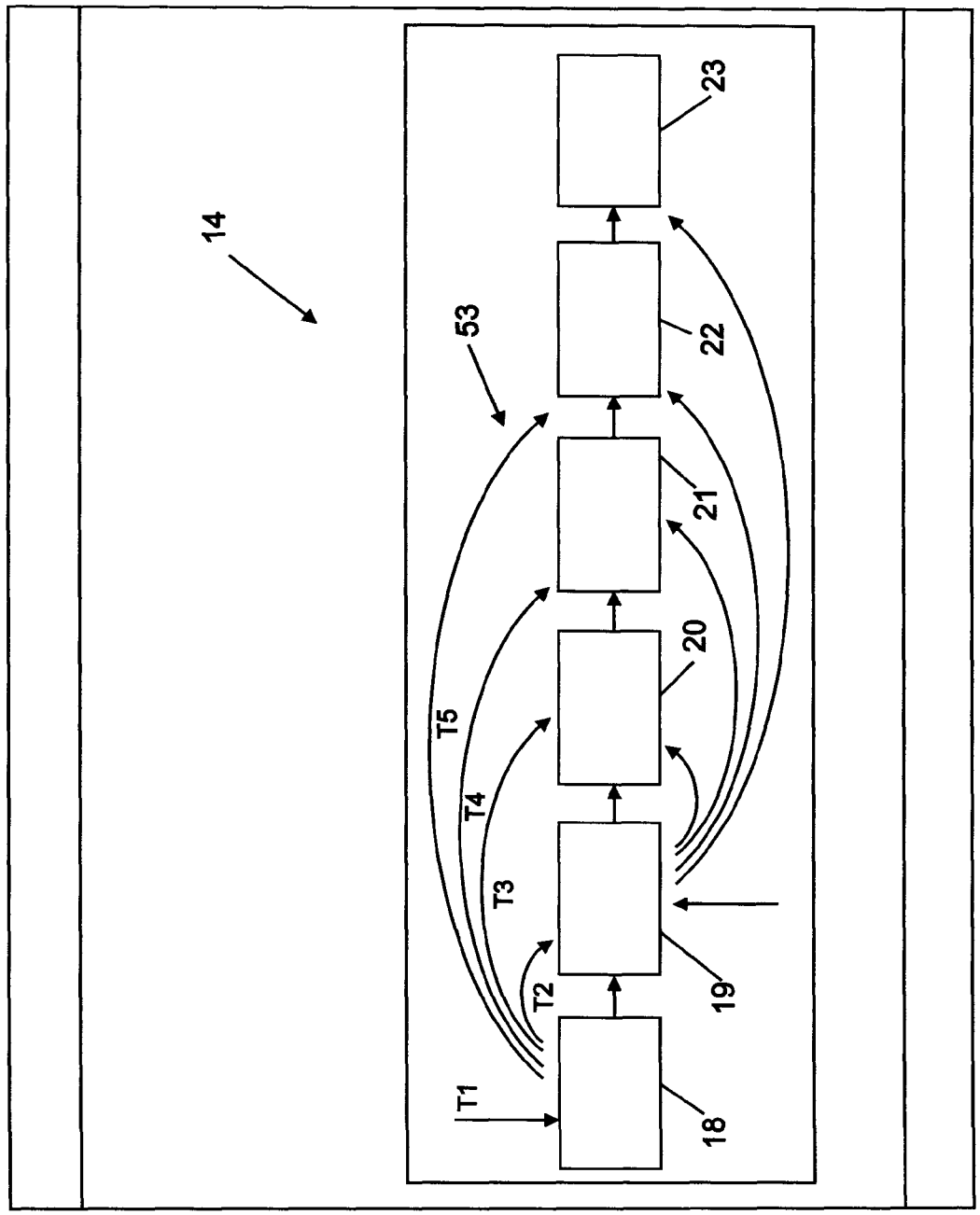
FIG. 4 is a second analysis strategy employed by the exemplary method of FIG. 1.
Figure 5:
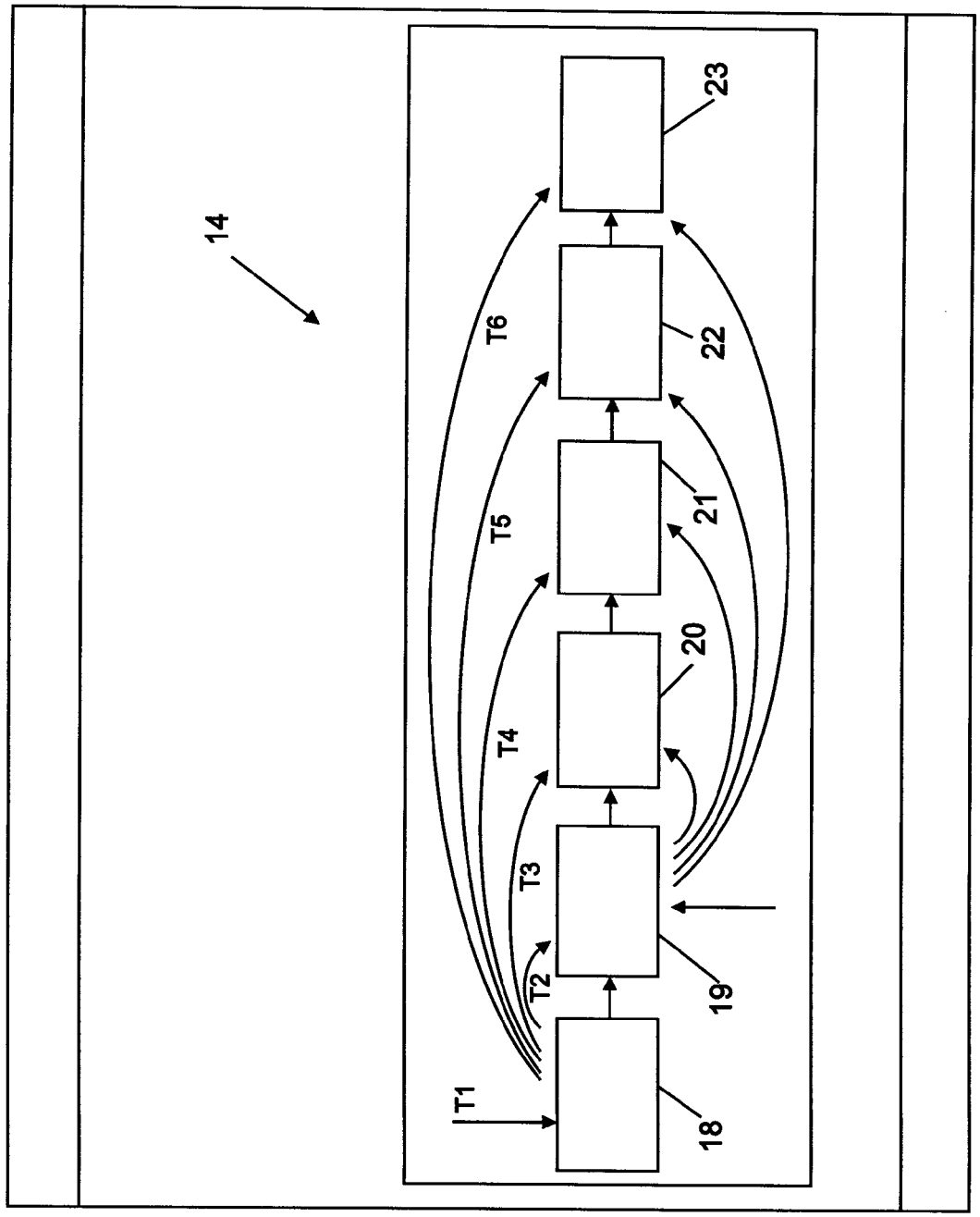
FIG. 5 is a third analysis strategy employed by the exemplary method of FIG. 1.

The user is presented with three possible selections for the particular analysis option to be input into block 40. That is, the user can select between a single step method 43, such as illustrated in FIG. 3, a multiple step method 53, such as illustrated in FIG. 4 and a brute force method 63, such as illustrated in FIG. 5. In single step method 43, the user selects a range of process steps to be analyzed. With this option, queue times are analyzed for each process step individually. In addition, the user is presented with an option of selecting between positive or negative slope correlations to be used by optimization method 2 for ranking queue times for overall process 14.

In multiple step method 53, the user selects a starting process step and an ending process step. In multiple step method 53, queue times are analyzed for each process step selected and summed. More specifically, a first variable T1 is defined by the queue time for process block 18, a second variable T2 is defined by T1 plus queue time for process block 19, a third variable T3 is defined as T2 plus two queue for process block 20, a fourth variable T4 for is defined as T3 plus the queue time for process block 21 and the fifth variable, T5 is defined as T4 plus the queue time for process block 22. Once the first process step is analyzed, multiple step method 53 shifts by one process and recalculates. This process repeats until a single process step, i.e., the ending process step, remains. Thus, multiple step process 53 establishes a sliding window analysis with a shifting starting process step and a fixed end process step.

Finally, if a batch job is desired, e.g., an analysis that requires little input, the user can select a brute force method 63. Brute force method 63 is similar to multi-step method 53 without the requirement for a user defined end limit of the number of process steps. In brute force method 63, the user simply indicates a start process step, such as illustrated in FIG. 5, and calculations are carried out, and repeated, for the remaining, subsequent process steps in production cycle 14. Thus by selecting one process step, the remaining process steps are also selected. Once the particular analysis option has been chosen in block 40, start and/or and process steps are input in block 69. Of course, for brute force method 63 only a start process step is required. At this point, optimization method 2 queries process time data for all selected process steps in block 74 and correlates input/dependent variables with process time in block 78.

Once process time data has been correlated with if the input data selected in blocks 4 or 6, optimization method 2 runs a statistical analysis based on the particular dependent variable chosen in block 80. As noted above, dependent variables are numeric, and input in block 4, optimization method 2 employees at a (GLM) as a statistical analysis tool. On the other hand, the dependent variables is categorical, optimization method 2 employs the (ANOVA) model as a statistical analysis tool. Once a statistical analysis is complete in block 80, optimization method 2 outputs a visual illustration of the results in identifying critical process steps in block 84. When an ANOVA model is employed, the visual illustration is based on p-values calculated in block 80. At this point, the user can take necessary actions to reduce queue time for critical steps identified by method 2. For example, the user can get new control limits for queue times in the critical process steps in order to positively affect yield and/or quality. In any event, the statistical analysis determines correlation between queue times and various product parameters such as product yield and product quality.

At this point it should be appreciated that optimization method 2 provides a system for analyzing queue times in a production cycle that avoids many of the drawback associated with existing methodologies. More specifically, by statistically analyzing queue times for at least one process cycle, and viewing an illustration that presents the statistical analysis identifying process critical steps, any problems associated with inexperience, subjectivity and time are removed. That is, the present invention embodiments provide an objective view of production cycle that provides personnel with an ability to reliably and confidently to identify queue times that may effect dependent variables in the production process. In any event, it should be understood that while although described with reference to illustrated aspects of the present invention, it should be readily understood that various changes and/or modifications can be made to the invention without departing from the spirit thereof. For instance, in addition to GLM and ANOVA statistical models, the present invention can employ MANOVA. Thus, it should be understood that the particular statistical model employed can vary depending on the input/dependent variable and the desired output. In addition, while described in connection with a semiconductor chip/wafer fabrication process, the present invention can be employed in any suitable manufacturing process having multiple process steps. In general, the invention is only intended to be limited by the scope of the following claims.

The invention claimed is:

1. A method of analyzing production cycle queue time to optimize process steps, the method comprising using a computer in:
    selecting a plurality of process steps for a production cycle;
    calculating queue times for each of the plurality of process steps in a semiconductor fabrication process operation;
    statistically analyzing the queue times to determine a correlation between queue times and at least one of process yield and quality;
    generating at least one visual output illustrating the statistically analyzed queue times; and
    adjusting a parameter of the process steps to reduce the queue times.

2. The method of claim 1, wherein statistically analyzing the queue times includes analyzing the queue times with a general linear statistical model.

3. The method of claim 1, wherein statistically analyzing the queue times includes analyzing the queue times with an analysis of variance model, said analysis of variance model generating a p-value.

4. The method of claim 3, wherein the visual output is based on the p-value.

5. The method of claim 1, wherein analyzing the queue times includes a single step method, said single step method analyzing queue times for individual ones of each of the plurality of process steps.

6. The method of claim 1, wherein analyzing the queue times includes a multiple step method, said multiple step method sequentially analyzing queue times for select ones of the plurality of process steps, said select ones of the plurality of process steps including a selected starting process step and a selected ending process step.

7. The method of claim 1, wherein analyzing the queue times includes a brute force method, said a brute force method sequentially analyzing queue times for select ones of the plurality of process steps, said select ones of the plurality of process steps including a selected starting process step.

8. The method of claim 1, wherein analyzing the queue times includes analyzing the queue times to determine correlations to a dependent variable.

9. The method of claim 1, further comprising: analyzing the visual output to determine a particular queue time to be optimized.

10. A computer program product comprising:
a computer useable storage medium including a computer readable program, wherein the computer readable program when executed on a computer causes the computer to:
calculate queue times for each of a plurality of selected process steps for a production cycle;
statistically analyze the queue times for the selected process steps to determine a correlation between queue times and at least one of process yield and quality;
generate at least one visual output illustrating the statistically analyzed queue times; and
adjusting a parameter of the process steps to reduce the queue times.

11. The computer program product according to claim 10, wherein the computer readable program when executed on a computer causes the computer to:
statistically analyze the queue times with a general linear statistical model.

12. The computer program product according to claim 10, wherein the computer readable program when executed on a computer causes the computer to:
statistically analyze the queue times with an analysis of variance model, said analysis of variance model generating a p-value.

13. The computer program product according to claim 12, wherein the computer readable program when executed on a computer causes the computer to:
generate the visual output based on the p-value.

14. The computer program product according to claim 10, wherein the computer readable program when executed on a computer causes the computer to:
analyze the queue times in a single step, said single step including calculating queue times for all of the plurality of process steps.

15. The computer program product according to claim 10, wherein the computer readable program when executed on a computer causes the computer to:
analyze the queue times in multiple steps, each of the multiple steps including calculating queue times for each of a plurality of selected process steps, said selected process steps including a starting process step and an ending process step.

16. The computer program product according to claim 10, wherein the computer readable program when executed on a computer causes the computer to:
analyze the queue times by brute force including sequentially analyzing the queues times for the selected process steps, said selected process steps including a starting step.

17. The computer program product according to claim 10, wherein the computer readable program when executed on a computer causes the computer to:
determine correlations between queue times and a dependent variable; and
quantitatively evaluate a relationship between queue time and one of product yield and product quality.

18. The computer program product according to claim 10, wherein the computer readable program when executed on a computer causes the computer to:
calculate queue times for a semiconductor fabrication process.

19. The computer program product according to claim 10, wherein the computer readable program when executed on a computer causes the computer to:
determine at least one of the plurality of process steps of a process cycle to be optimized.

\* \* \* \* \*